Nov. 21, 1939.  E. J. DILLMAN  2,180,802
CONTROL DEVICE
Filed April 3, 1936   3 Sheets-Sheet 1
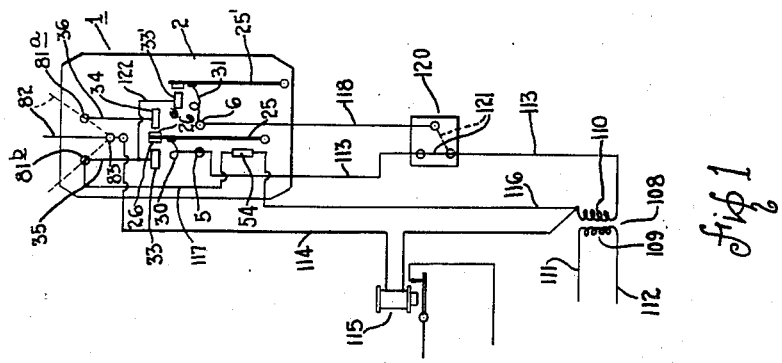
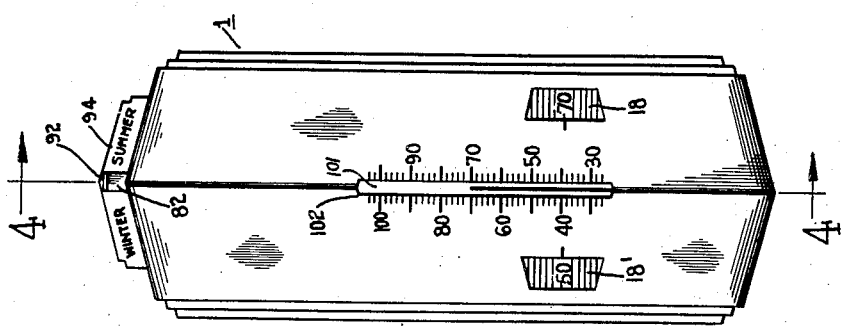
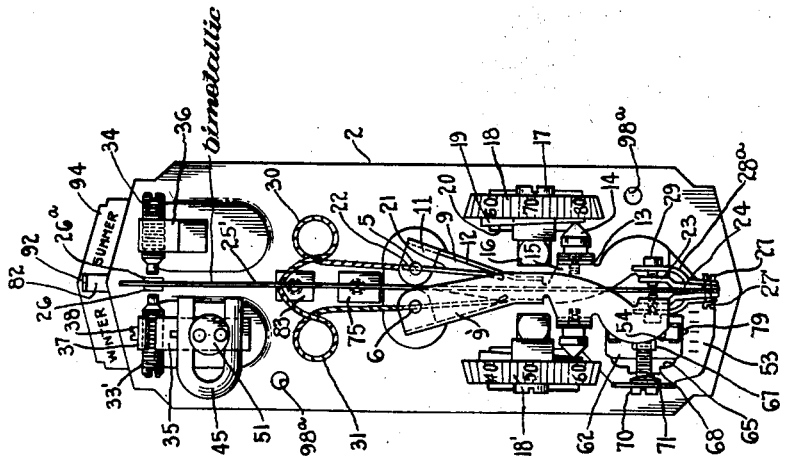
INVENTOR
Earnest J. Dillman
BY
Andrew K. Fowlds
his ATTORNEY

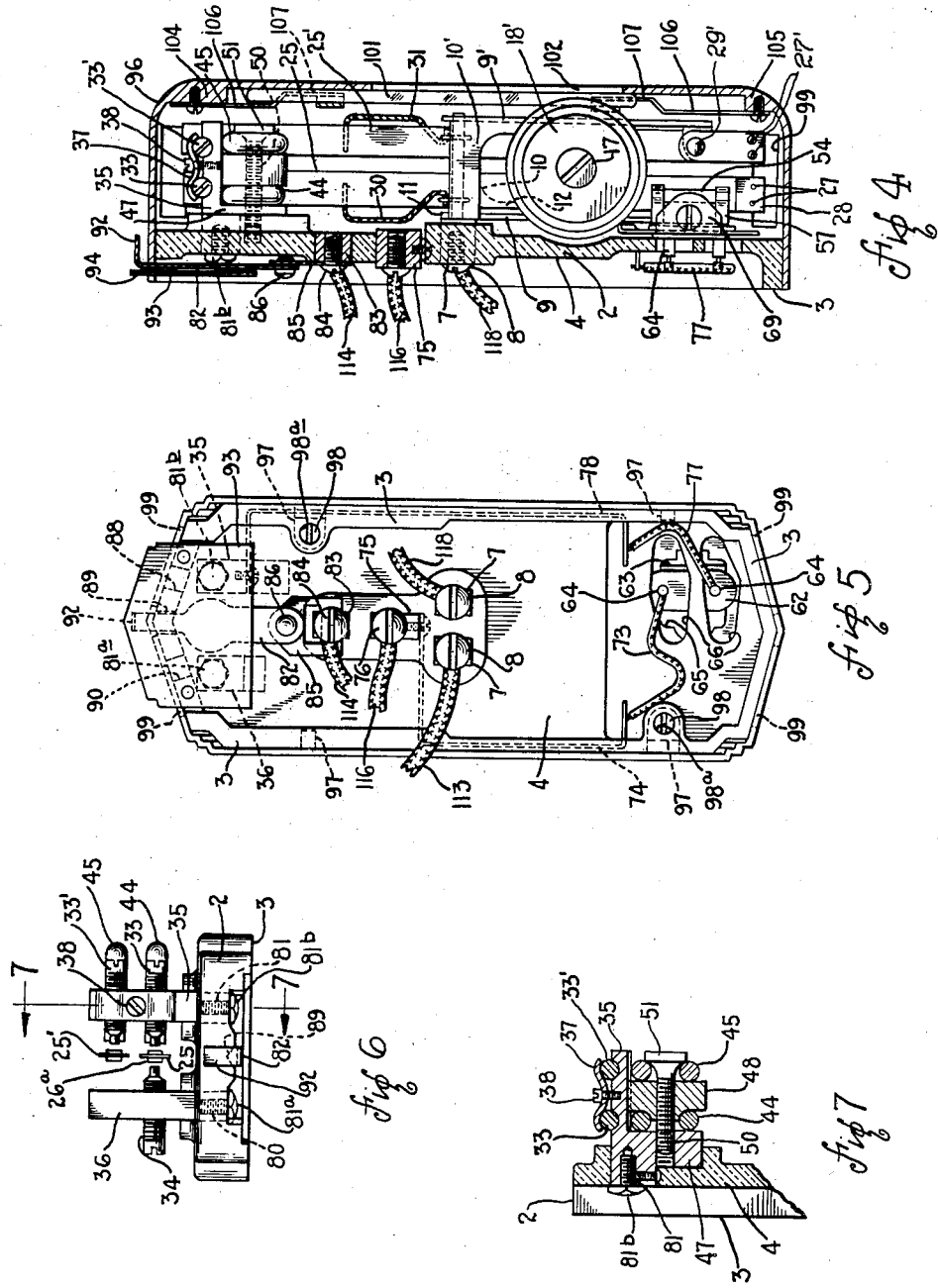

Nov. 21, 1939.  E. J. DILLMAN  2,180,802
CONTROL DEVICE
Filed April 3, 1936   3 Sheets-Sheet 3
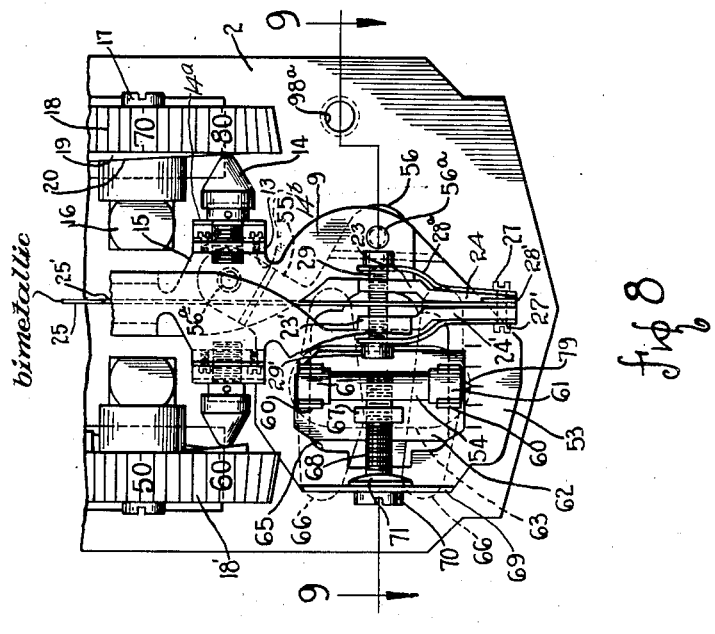
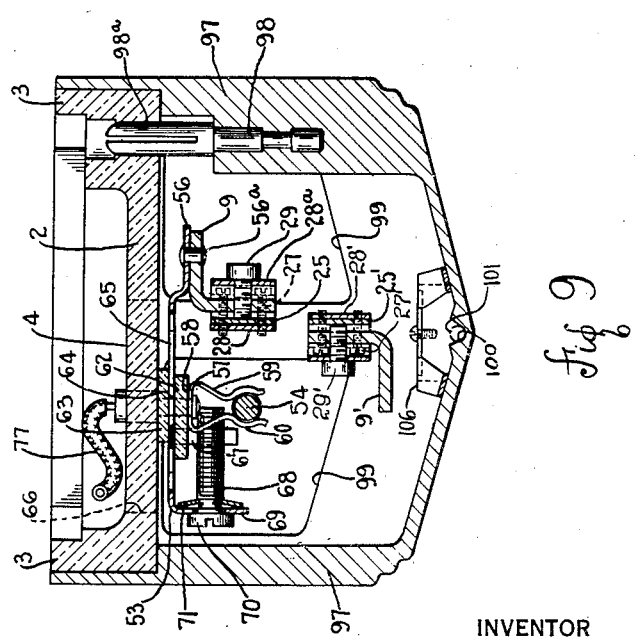
INVENTOR
Earnest J. Dillman
BY
Andrew K. Foulds
his ATTORNEY Patented Nov. 21, 1939

2,180,802

UNITED STATES PATENT OFFICE 2,180,802

CONTROL DEVICE

Earnest J. Dillman, Detroit, Mich., assignor to Detroit Lubricator Company, Detroit, Mich., a corporation of Michigan Application April 3, 1936, Serial No. 72,603

25 Claims. (Cl. 200—122)

My invention relates generally to control devices and more particularly to thermostats for controlling the condition of the air in a room or other enclosed space.

One of the objects of my invention is to provide a new and improved thermostat of a character such that it can be employed to control the condition of the air of a room or other enclosed space both in winter and in summer.

Another object of my invention is to provide a thermostat operable to control a heating means in winter and a cooling means in summer and one which is so constructed that it may be easily and readily converted from a heating means control to a cooling means control, or vice versa.

Another object of my invention is to provide a control system including a thermostat operable to control a heating means in the winter and a cooling means in the summer through the controlling of the operation of a single controlling means for both the heating means and the cooling means.

Another object of my invention is to provide a new and improved thermostat for controlling the temperature of a room and one which has new and improved heating means for influencing the operation of the thermostat to prevent heat input into the room in excess of that necessary to maintain the desired room temperature.

The invention consists in the improved construction and combination of parts, to be more fully described hereinafter and the novelty of which will be particularly pointed out and distinctly claimed.

In the drawings, to be taken as a part of this specification, I have fully and clearly illustrated my invention, in which drawings—

Figure 1 is a diagrammatic view showing a control system including one type of electrical circuit in which my thermostat may be connected to control the operation of means for maintaining the condition of the air in a room or other space, as desired, both in winter and summer;

Fig. 2 is a view in front elevation of my thermostat;

Fig. 3 is a view in front elevation of my thermostat with the cover removed to show the thermostat mechanism and associated parts;

Fig. 4 is a view taken along the line 4—4 of Fig. 2 showing the cover of the thermostat in vertical central cross section but showing the mechanism of the thermostat in side elevation;

Fig. 5 is a rear view in elevation of my thermostat;

Fig. 6 is a top plan view of my thermostat with the cover removed;

Fig. 7 is a view shown in cross section taken along the line 7—7 of Fig. 6;

Fig. 8 is an enlarged fragmentary view showing certain of the parts of the thermostat, and Fig. 9 is a view shown in cross section and taken along the line 9—9 of Fig. 8.

Referring to the drawings by characters of reference the numeral 1 designates in general a thermostat having a base 2 on which is mounted the thermostat mechanism and associated parts which are hereinafter described in detail. The base 2 of the present thermostat is of general rectangular shape and is preferably constructed of a suitable electric insulating material, such as Bakelite. Preferably the base 2 is formed having flange portions 3 along its side and end edges which extend rearwardly from one face, or back 4 of the base, and the rear edges of the flange portions 3 abut a wall or other surface on which the thermostat is mounted.

Secured in the base 2 substantially midway between its ends there is a pair of spaced, laterally positioned bearing posts 5, 6 which extend substantially parallel relative to each other and vertically from the front face of the base. The posts 5, 6 preferably have enlarged end portions 7 which extend through the base, the enlarged portions 7 having threaded apertures for receiving binding posts which may be screws, as at 8, which thread longitudinally into the enlarged end portions of the posts from the back of the base. The post 5 has an adjustment lever 9 pivoted thereon adjacent the face of base 2, the lever 9 being apertured at one end to receive the post 5. The lever 9 preferably has a flange 10, see Fig. 4, which extends parallel and adjacent to post 5. The flange 10 has a laterally extending portion or ear 11 which is apertured and positioned to receive the post 5 at a point adjacent the outer end of the post so that the lever 9 is rigidly held against rocking movement in planes through the longitudinal axis of the post 5. The lever 9 is provided with a reenforcing and spring abutment flange 12 extending forwardly and along the outer side edge thereof and joining with the flange 10 of the lever. The flange 12 terminates substantially midway of the length of the lever 9, and beyond the end of the flange 12 there is an extended flange portion or ear 13, see Figs. 3 and 8, which extends substantially vertically from lever 9 and which carries a cam follower member 14 which projects horizontally from the outer side edge of the lever.

The follower member 14, shown as a threaded element, is frictionally held in adjusted position by means of a leaf spring 14ª. This spring is secured at one edge or end portion by screws 14ᵇ to the flange portion 13, and has its other or free end portion engaging against the head of the follower member so that the spring 14ª is held under tension to substantially lock the follower member in adjusted position. The ear 13 is preferably carried on the outer end of an extension 15 projecting from the outer side edge of the lever 9.

Rigidly mounted on the base 2 intermediate the extension 15 and the post 5, there is a supporting post 16 which extends vertically from the front face of the base. Pivotally supported on a shaft 17 secured at one end in the post 16 and projecting horizontally therefrom transverse to lever 9, these is a cam wheel 18 having a circular cam 19 of less diameter than the wheel 18. The cam 19 projects from the inside face of the wheel 18 toward the lever 9 and has a spiral cam face 20 which engages the cam follower 14. The lever 9 is held in adjusted position, through the follower 14 engaging the cam face 20, by a leaf spring 21, preferably a piece of spring wire having one end 22 fixed to the post 5 and extending into an aperture diametrically therethrough and having its other end engaging the inside face of the flange 12 of lever 9.

The free or lower end of the lever 9 is provided on its inner edge with a forwardly extending flange 23 having an inwardly offset portion 24 which extends longitudinally beyond the end of the lever 9. Secured to the inside face of the offset portion 24 there is one end of a thermostatic or bi-metal element or blade 25 such as an arm member which extends longitudinally of the lever 9 and terminates adjacent the upper end of the base member 2. The blade 25 is provided at its free terminal end portion with oppositely facing electric contracts 26, 26ª. The blade 25 may be secured to the offset portion 24 of lever 9 by screws 27 which pass through the blade and are threaded into a plate 28 which clamps the blade against the portion 24. The screws 27 also secure a resilient leaf or plate 28ª to the outer face of the flange portion 24, the plate 28ª engaging at its free end under the head of an adjustment screw 29 which is screw threaded through the flange 23 so as to hold the screw in adjusted position. The screws 27 and plate 28ª tension the blade 25 against the inner end of the screw 29 so that the screw is operable to adjust the position of the blade 25 relative to the lever 9.

The present thermostat has a second thermostatic element or blade, such as an arm member designated in general by the numeral 25', which is supported by an adjustment lever 9' adjustable by means of a cam wheel 18'. The blade 25' is adapted to control the condition of the air of a room during the night while the blade 25 is adapted to control the condition of the air of the room during the day. The blades 25 and 25', which may be termed the day and night blades respectively, are laterally positioned and are disposed in substantially vertical alignment, as seen from the front of the thermostat, the blade 25' in the present construction being positioned in advance or forward of the blade 25. The adjustment lever 9' for the night blade is the same in shape and construction as the adjustment lever 9 of the day blade, the lever 9' being positioned on the base in reversed relation to the lever 9. The blade 25' and its associated parts are the same in construction as the blade 25 and its associated parts, hereinbefore described, and therefore a detailed description of the night blade and its associated parts is deemed not necessary. The day blade 25 is connected in an electric circuit to the post 5 by a jumper strip or wire 30, and the night blade 25' is connected in an electric circuit to the post 6 by a jumper strip or wire 31.

The free or upper end portion of the blade 25 is positioned between oppositely disposed contact members 33, 34, preferably in the form of screws supported by spaced suporting blocks 35, 36 of electric conducting material. The supporting blocks 35, 36 are secured in the base 2 on opposite sides of the blades 25 and 25' and extend vertically from the front face of the base. The block 35 also supports a contact member or screw 33', in spaced parallel relation to contact member 33, for cooperation with the blade 25'. In the upper end of the supporting block 35 there is a pair of spaced, parallel grooves which are threaded for receiving the screw contact members 33, 33'. The positions of the screw contacts 33, 33' are adjustable relative to their blades and are held against movement from their adjusted positions between the supporting block 35 and a plate member 37, Fig. 7. The plate member 37 is preferably formed having a pair of spaced, laterally positioned grooves or bent portions for receiving and abutting exposed surfaces of the contact members 33, 33'. The plate member 37 may be releasably secured to the supporting block 35 by a screw 38 which may thread into the block between the contact members. The contact member 34 is adjustably screw threaded into an aperture in the supporting block 36 and, by rotating the member 34 its inner end may be positioned relative to blade 25, as desired.

The free or upper end portions of the blades 25, 25' constitute armatures for cooperation with magnets 44, 45 which provide for positive engagement of the blades with the contacts 33, 33' and also control the differential operation of the blades. The suporting block 35 has a downwardly extending portion or leg 47 which extends longitudinally of the base 2 and against which the magnets 44, 45 are held, the magnets in the present instance being of the U-shaped permanent type. The magnet 44 rests against the face of the leg 47 and the magnet 45 is spaced from the magnet 44 by a spacer member or block 48, the magnets being in overlying relation with their poles disposed toward and in close proximity to the blades 25 and 25' respectively. The spacer member 48 has an aperture therethrough for receiving a screw 50 which threads into the leg 47, the screw 50 having a head 51 the underside of which abuts the parallel arms of the magnet 45 for tightly clamping the magnets, spacer member and supporting block together. The position of the poles of the magnets relative to the blades may be adjusted as desired and the screw 50 tightened to hold the magnets against movement. If the poles of the magnets are positioned closer to the blades, the differential between making and breaking of contact will be increased as it will require a greater force to overcome the correspondingly increased effective attractive force of the magnets, and conversely, if the poles of the magnets are moved or positioned farther away from the blades, the differential between making and breaking of contact will be decreased.

Carried by the adjustment lever 9, Figs. 8 and 9, adjacent the lower end of the base 2 there is a supporting member in the form of a metallic plate 53 on which is supported an electrically energized heating element, or heat generating electric current resistance means 54 for influencing the operation of the temperature responsive blade 25. The supporting plate 53 is disposed on one side of the blade 25 below the cam wheel 18, and is disposed substantially parallel and in close proximity to the face of the base 2. In the present instance, the supporting plate 53 is formed having two spaced extended portions or arms 55 and 56 which extend beneath the lever 9, the lever and arm portions having aligned apertures for receiving rivets 56a for rigidly securing the plate and lever together. Preferably the heating element 54 is constructed of a material having a high resistance to the passage of electric current, and in the present instance, consists of a piece of cylindrically shaped Carborundum. The cylindrical heating element 54 is positioned longitudinally of the blade 25 at one side thereof and is removably supported and held by a pair of spaced, U-shaped supports or clasps 57 which are mounted one above the other on the supporting plate 53. The U-shaped supporting members 57 each have a base portion 58 and spaced, oppositely disposed spring side portions 59 which extend forwardly from the plate 53, the end portions of the side portions 59 preferably being formed with opposed inwardly facing indented portions 60 for receiving the cylindrical heating element 54. The U-shaped supports or clasps 57 engage the cylindrical heating element 54 at its end portions, and preferably the supports 57 are constructed of a good electric current conducting material, such as copper, and the end portions of the heating element 54 provided with a coating of metal such as brass, indicated at 61, to obtain a good electrical connection between the heating element and its supporting members. The supporting members 57 are mounted for movement on the plate 53, laterally to the blade 25, so that the heating element 54 can be moved closer to, or farther away from the blade 25 for varying the effect of the heating element on the operation of the blade. Between the bases of the spring clasps 57 and the front face of the supporting plate 53 there is a piece of electric insulating material 62, and between the rear face of the supporting plate 53 and the face of the base 2 there is a second piece of electric insulating material 63, the pieces of insulating material serving to insulate the U-shaped supports 57 from the metallic supporting plate 53. The bases of the U-shaped supports 57 rest on the piece of insulating material 62, and the pieces of insulating material 62 and 63 and the bases of the supports are provided with aligning apertures for receiving terminal posts 64 which serve to secure the supports and the pieces of insulating material together. In the supporting plate 53 there is provided a substantially square opening 65 which overlies two spaced, slotted apertures 66 which are laterally positioned and extend crosswise of the base 2. The terminal posts 64 extend through the opening 65 in the supporting plate 53 and have enlarged end portions which extend through the slotted apertures 66 in the base 2 and project slightly beyond the rear face 4 of the base. The pieces of insulating material 62 and 63 are substantially rectangular in shape, in the present instance, and extend longitudinally of the base overlying the opening 65 in the supporting plate 53 and in overlying relation to each other, the pieces of insulating material having end portions slidably resting on the plate 53. Secured in the piece of insulating material 62, intermediate its ends at one side of the heating element 54 there is a nut 67 having a threaded aperture for receiving an adjustment screw 68 by means of which the position of the heating element may be adjusted relative to the blade 25. The supporting plate 53 is formed having a forwardly extending flange 69 which has an aperture therethrough aligning with the threaded aperture in the nut 67 and which supports the outer end of the screw 68, the screw having a head 70 which abuts the outer face of the flange 69 to prevent longitudinal movement of the screw in one direction. Longitudinal movement of the screw 68 in the opposite direction may be prevented by the use of a spring washer 71 which, at its inner periphery, abuts a shoulder on the screw 68 and at its outer periphery abuts the inner face of the flange 69. One of the terminal posts 64, Fig. 5, has one end of a wire 73 connected thereto at the back of the base 2, the other end of the wire 73 being connected to one end of a metallic current conducting strip 74 which is molded in the base 2. The other end of the strip 74 is connected to a metallic terminal post 75 which is secured in the base 2 above the posts 7, the terminal post 75 being provided with a threaded aperture for receiving a binding post or screw 76 which threads thereinto from the back of the base 2. The other of the terminal posts 64 has one end of a wire 77 connected thereto, the other end of the wire 77 being connected to one end of a metallic current conducting strip 78 which, like the strip 74, is preferably molded in the electric insulating base 2. The other end of the strip 78 is connected to the supporting block 35 which supports the contact members 33, 33'. The piece of insulating material 62 may be provided with an extended portion 79 in the form of a pointer and the front face of the supporting plate 53 provided with indicia cooperable with the pointer 79 for indicating the adjusted position of the heating element 54 relative to the blade 25.

End portions of the supporting blocks 36, 35 extend through the base 2 and have threaded apertures for receiving screws 80 and 81 respectively which thread thereinto from the back of the base and have heads 81a and 81b which constitute contact members for contact with a manually operable switch means or lever 82. Secured in the base 2 above the binding post 76 there is another terminal post 83 into which a binding post or screw 84 threads from the back of the base, and between the head of the screw 84 and the end of the post 83 there is a plate member 85 of good electric conducting material. The plate member 85 extends upwardly from the terminal post 83 and the lower end of the switch arm or lever 82 is pivotally secured thereto by a rivet 86, or other suitable means, the pivotal point of the switch arm 82 being below and between the contact members 81a and 81b. The switch arm extends upwardly from its pivot point and, in the present instance, has an enlarged surface portion between its ends for engagement with the contact members 81a and 81b. In the forwardly extending flange portions 3 which extend along the upper end edges of the base 2 there is provided three spaced notches 88, 89 and 90, for receiving the switch arm 82. When the switch arm 82 is located in the center notch 89 the switch is in "off" position. When the switch arm is located in the notch 88 it is in contact with the contact member 81b and the thermostat 75 is set for winter operation, or to control the operation of a heating means. When the switch arm is positioned so that it locates in the notch 90 the switch will be in contact with the contact member 81ª and will be set for summer operation, or to control the operation of a cooling means. The upper end of the switch arm 82 projects above the upper end of the base 2 and may be formed, as shown, with a forwardly extending flange portion or finger engaging arm 92. Positioned behind the switch arm 82 there is a plate member 93 secured to the base 2 and which has an upper end portion 94 extending above the upper end of the base and plainly visible from the front of the thermostat. The words "winter," "off" and "summer" may be provided on the front face of the plate portion 94 for indicating the corresponding settings of the switch arm 82.

The base 2 and thermostatic mechanism mounted thereon may be enclosed by a box-like casing or cover 96 which fits or telescopes over the side and end edges of the base. The casing 96 is preferably a casting and is formed having extending portions in the form of ribs 97 which extend along the inner side walls of the casing and from the front face thereof toward the face of the base 2. There are four of the ribs 97, in the present instance, there being two in spaced relation to each side wall of the casing. The ribs 97 terminate short of the rear edge of the casing 96 and the face of the base seats against the ends of the ribs with the rear face of the base being substantially flush with the rear side and end edges of the casing 96. Secured in diagonally opposite ribs 97 of the casing 96 there are pins 98 which have end portions for extending into apertures 98ª provided in the base 2. The end portions of the pins 98 are longitudinally slotted so as to frictionally engage in the apertures in the base to hold the cover in place. The cover or casing 96 is thus readily removable from the base without the necessity of removing screws, or other attaching means.

The casing 96 is provided with openings or apertures 99 in its top and bottom walls for the passage of air through the interior of the casing. The casing 96 is preferably cast having a rearwardly facing, longitudinally and vertically extending groove or slot-like recess 100, Fig. 9, formed in the front wall of the casing and disposed centrally between the side walls of the casing. Positioned in the recess 100 there is a thermometer 101, Fig. 4, comprising a cylindrical glass tube containing a suitable expansible-contractible temperature responsive medium such as mercury, the casing front wall being provided with a vertically extending centrally disposed slotted aperture 102 through which the mercury in the tube is visible from the front of the casing. Suitable indicia may be provided on the face of the casing 96 for indicating the room air temperature. The front wall of casing 96 is provided with rearwardly extending and centrally disposed bosses 104 and 105 at the top and bottom, respectively, of the casing and secured to the rear face of each of the bosses 104 and 105 there is one end of a clamping plate 106. The clamping plates 106 have outwardly offset end portions 107 extending toward each other and positioned back of the upper and lower end portions of the thermometer tube 101. End portions of the offset portions 107 are bent or recessed to receive the tube 101 against which they bear to hold the tube tightly to the rear wall of the casing 96. In the front wall of the casing 96, on each side of the thermometer, there is provided an opening, one for each of the cam wheels 18 and 18', the cam wheels having portions extending through the openings so as to be accessible for operation without removing the casing.

Referring now to Fig. 1 in which my thermostat is diagrammatically represented and shown connected in an electrical system for controlling the condition of the air in a room both in summer and in winter, the numeral 108 designates a transformer in the system, the transformer including the usual primary 109 and secondary 110. Main lead wires 111 and 112 lead and connect to terminals of the transformer primary. Connecting a terminal of the transformer secondary 110 and the post 5 of the thermostat there is a lead wire 113, the post 5, as previously mentioned, being connected to the blade 25 by a jumper wire 30. The contact 33, which is adapted to be engaged by the blade 25 during the heating season and which may be termed the heating contact, is electrically connected to the winter contact 81ᵇ through the metallic supporting block 35, this connection being diagrammatically represented in Fig. 1 by a line designated 35. Likewise the contact 34 which is adapted to be engaged by the blade 25 during the cooling season is connected to the summer contact 81ª through the metallic supporting block 36, the block being represented in Fig. 1 by a line designated 36. From the terminal post 83, which is electrically connected to the switch 82 by the jumper strip 85 there is a lead wire 114 which connects to the transformer secondary 110 and in the lead wire 114 there is a relay, designated in general by the numeral 115. Connected to the circuit of the relay 115 there may be a motor means (not shown) for operating a damper for controlling flow of air or other heating and/or cooling medium to a room, or a cooling apparatus and a heating apparatus may be electrically connected in circuit with the relay, such apparatuses being well known in the art to which this invention appertains. Connecting the other terminal of the transformer secondary 110 and the terminal post 75 there is a lead wire 116, the terminal post 75 being connected to one terminal post 64 of the heating element 54, as previously described, by the strip 74 and wire 73. The other terminal post 64 of the heating element 54 is connected to the post 35, as previously described, by the wire 77 and metallic strip 78, this connection being represented in Fig. 1 by a line 117. In the lead wire 113 which connects the transformer secondary 110 and the terminal post 5 there is a time-controlled device or clock 120, the post 6 also being connected to the clock by a lead wire 118. The clock 120 may be of any suitable type adapted to be set to operate a switch 121 at desired times to throw the circuit from the day blade 25 to the night blade 25' and vice versa. The contact 33', or night contact, is connected to the contact 81ᵇ through the supporting block 35, the supporting block being represented in Fig. 1 by a line 122.

When the manual switch 82 is in engagement with the contact 81ᵇ, or set for winter operation, the following circuit is completed to the relay 115 when the blade 25 engages contact 33: From the transformer secondary 110, lead wire 113, switch 121, lead wire 113, post 5, wire 30, blade 25, contacts 26, 33, post 35, contact 81ᵇ, switch 82, jumper strip 85, post 83 and lead wire 114, relay 115 and back to the transformer secondary 110. Additional heat is then supplied to the room by the heating means until the blade 25 breaks circuit with the contact member 33. When the blade 25 makes contact with contact member 33 and energizes the relay 115 the heating element 54 is also energized, the heating element being in parallel circuit with the relay 115, which circuit is as follows: From the transformer secondary 110, lead wire 116, heating element 54, line 117, contact 81b, line 35, contacts 33, 26, blade 25, wire 30, post 5, lead wire 113, switch 121, lead wire 113 and back to the transformer secondary 110. The heating element 54 then heats the blade 25 and raises its temperature a predetermined degree above the effective room air temperature of the blade, which increase in temperature may be taken as 2° F. for purposes of exposition. If the thermostat is set to close circuit to the relay 115 at say 70° F. and to open circuit at say 74° F., it will be seen that the blade 25, by reason of the influence of the heating element 54 will break circuit when the temperature of the ambient room air is 72° F. The heating element 54 thus compensates for the time period or time lag between the time of heat input into the room and the time when such heat input raises the temperature of the thermostatic blade to the temperature for which it is set, and in this manner a more uniform room air temperature is obtained. By moving the heating element closer to the thermostatic blade 25 the cycles of operation of the heating means will be shorter and, conversely, the further the heating element is moved away from the blade the longer the heating cycles will be. For night operation of the heating apparatus the blade 25' may be set by means of the cam wheel 18' to maintain the temperature of a room or rooms, as is usually desired, at a lower temperature than that maintained during the daytime, and the clock 120 may be set to throw the circuit from the day blade to the night blade, and vice versa, at predetermined times.

Between the heating season and the season when it is desirable to cool the air of a room for comfort, the switch 82 may be positioned as shown and in this position the circuit to the relay 115 is open. When it is desired to cool the air of a room or other enclosed space, the switch arm 82 is moved to the right, as seen in Fig. 1, to engage with contact 81a. When the thermostat is set for summer operation it will be seen that the circuit is open to the heating element 54. When the blade 25 engages contact 34 the following circuit is completed to the relay 115: From the transformer secondary 110, lead wire 113, clock switch 121, post 5, jumper strip 30, blade 25, contacts 26a and 34, block 36, contact 81a, manual switch arm 82, lead wire 114 to the relay 115 and from the relay to the transformer secondary 110. The relay 115 is then energized and circuit made to a control means controlling a damper, or to a cooling apparatus. The room is thus reduced in temperature until the blade 25 is satisfied and breaks circuit to the relay 115. By providing the manual switch 82 it will be seen that a single relay may be employed for both summer and winter operation. It will also be seen that by reason of the manual switch 82 the relay 115 will not be energized should the blade 25 for any reason move into engagement with the summer contact when the switch is set for winter operation. Due to the snap action of the blade when the attractive force of the magnet 44 is overcome, the blade will likely move past the center and engage the summer contact 34, but since the circuit of contact 34 will be opened when the manual switch is set for winter operation it will be seen that the relay 115 will not be energized. Likewise when the thermostat is set for summer operation the relay 115 will not be energized in the event that the blade 25 should move into engagement with the winter contact 33. By providing for the heating element 54 to be carried by the adjustment lever 9 it will be seen that the position of the heating element relative to the blade 25 will not change when the blade is adjusted.

What I claim and desire to secure by Letters Patent of the United States is:

1. A thermostat comprising a base member, an adjustment lever pivotally mounted on said base member, a thermostatic blade carried by said adjustment lever, an electrically energized heating element carried by said adjustment lever for influencing the operation of said blade, a pair of contact members cooperable with said blade, one of said contact members being electrically connected to said heating element such that said heating element is energized upon contact between said one contact member and said blade, said blade being cooperable with said one contact member to control the temperature of a room to maintain the air of the room at a relatively high predetermined temperature and cooperable with the other of said contact members to control the temperature of the room to maintain a relatively low room air temperature, and a manually operable switch mounted on said base member and operable to change the circuit from one of said contact members to the other of said contact members.

2. A thermostat comprising a base, a pair of contact members mounted on said base, a thermostatic blade mounted on said base and cooperable with said contact members, said blade being cooperable with one of said contact members to maintain a predetermined substantially constant temperature in a room and cooperable with said other contact member to maintain a second predetermined substantially constant temperature in the room and lower than said first-named predetermined temperature, and switch means for changing the circuit from one of said contact members to the other.

3. A thermostat comprising a base, a pair of contact members mounted on said base, a thermostatic blade mounted on said base and cooperable with said contact members, said blade being cooperable with one of said contact members to maintain a predetermined substantially constant temperature in a room and cooperable with said other contact member to maintain a second predetermined substantially constant temperature in the room and lower than said first-named predetermined temperature, and a manual switch means pivotally mounted on said base and operable to change the circuit from one of said contact members to the other of said contact members.

4. A thermostat comprising a base member, a pair of spaced oppositely disposed supporting blocks mounted on said base member, contact members supported by said supporting blocks, a thermostatic blade mounted on said base member and having a free end portion disposed between said contact members, said blade being cooperable with one of said contact members to control the temperature of a room to maintain a relatively high predetermined room air temperature, said blade being cooperable with the other of said contact members to control the temperature of the room to maintain the room air temperature at a relatively low predetermined temperature, and a manual switch means mounted on said base member between said supporting blocks and operable to engage with one or the other of said supporting blocks and for changing the circuit from one to the other of said contact members.

5. A thermostat for controlling the energization of an electrically operated controlling means, comprising a base member, a pair of contact members mounted on said base member, a thermostatic switch mounted on said base member and connected in circuit with the electrically energized controlling means, said thermostatic switch being cooperable with one of said contact members in response to a predetermined relatively high temperature and cooperable with the other of said contact members in response to a predetermined relatively low temperature, and a manual switch mounted on said base member and electrically connected to said controlling means, said switch being operable to change the circuit from one of said contact members to the other of said contact members.

6. In a control device, a base member, a movable adjustment member mounted on said base member, a thermostatic element carried by said adjustment member, a control member carried by said element, a second control member carried by said base member, means for moving said adjustment member to adjust said thermostatic element to regulate the temperature at which said first-named control member is limited in its movement toward said second-named control member, and a heating element for influencing the operation of said thermostatic element, said heating element being positioned in lateral spaced relation to said thermostatic element so that said thermostatic element is heated substantially solely by radiation.

7. In a control device, a base member, an adjustment lever pivotally mounted on said base member, a thermostatic blade carried by said adjustment lever, a heating element disposed for heating said blade, said heating element being movable relative to said adjustment lever and closer to or farther away from said blade, and means for moving said heating element.

8. In a control device, a base member, an adjustment lever pivotally mounted on said base member, a thermostatic blade carried by said adjustment lever, a supporting member carried by said base member, a heating element mounted on said supporting member and disposed for heating said thermostatic blade, said heating element being movably mounted on said supporting member and movable relative to said blade, and means for moving said heating element.

9. In a control device, a base member, an adjustment lever pivotally mounted on said base member, a thermostatic blade carried by said adjustment lever, means for moving said adjustment lever to adjust said blade, a plate member carried by said adjustment lever, a heating element operable to heat said blade, said heating element being mounted on said plate member and movable therewith and with said lever so that the position of the heating element with respect to the blade will not change upon adjusting said blade, said heating element being movable relative to said plate member and relative to said blade, and means for moving said heating element.

10. In a control device, a base member having an opening therethrough, an adjustment lever pivotally mounted on said base member, a thermostatic blade carried by said adjustment lever, a supporting member carried by said adjustment lever and having an opening therethrough overlying the opening in said base member, an electrically energized heating element mounted on said supporting member and movable with said adjustment lever, said heating element being operable to influence the operation of said thermostatic blade, said heating element being movable relative to said supporting member and closer to or farther away from said blade, means for moving said heating element, and electric conducting members connected to and movable with said heating element and extending through said openings.

11. In a control device, a base member having an opening therethrough, an adjustment lever pivotally mounted on said base member, a thermostatic blade carried by said adjustment lever, a supporting plate carried by said adjustment lever and having an opening overlying the opening in said base member, supporting means mounted on said plate member, a readily removable heating element supported by said supporting means in a position to influence the operation of said thermostatic blade, a piece of electric insulating material disposed between said supporting means and said supporting plate, a second piece of electric insulating material disposed between said supporting plate and said base member, said pieces of insulating material overlying each other and said openings and slidably engaging opposite faces of said supporting plate, terminal members connected to said heating element and securing said supporting means and pieces of insulating material for movement together, said terminal members being disposed for movement in said openings, and means for moving said supporting means and said pieces of insulating material closer to or farther away from said blade.

12. In a thermostat, a base member, a pair of contact members mounted on said base member, a pair of thermostatic blades mounted on said base member, one of said blades being cooperable with one of said contact members to make and break a circuit between predetermined temperature limits and the other of said blades being cooperable with the other of said contact members to make and break a circuit between predetermined temperature limits below said first-named temperature limits, a pair of substantially U-shaped magnets mounted on said base member, each of said magnets urging one of said blades in one direction relative to its contact member, one of said magnets being positioned in overlying relation to the other magnet with the poles of one of said magnets disposed toward one of said blades and the poles of the other of said magnets being disposed toward the other of said blades, a spacer member between said magnets, and means for securing said magnets and spacer member together and to said base member.

13. In a thermostat, a base member, a pair of contact members mounted on said base member, a pair of thermostatic blades mounted on said base member, one of said blades being cooperable with one of said contact members to make and break a circuit between predetermined temperature limits and the other of said blades being cooperable with the other of said contact members to make and break a circuit between predetermined temperature limits below said first-named temperature limits, a pair of substantially U-shaped magnets mounted on said base member for urging said blades toward their respective contact members, one of said magnets being positioned in overlying relation to the other with the poles of one of said magnets disposed toward one of said blades and the poles of the other of said magnets being disposed toward the other of said blades, a spacer member between said magnets, and a screw extending between the legs of said U-shaped magnets and through said spacer member and securing the magnets and spacer member together and to said base member.

14. A thermostat for controlling the circuit of a control means to control the temperature of an enclosed space comprising a pair of contact members, a thermostatic element, said element being cooperable with one of said contact members for controlling said circuit to maintain a predetermined substantially constant temperature in the enclosed space, said element being cooperable with the other of said contact members for controlling said circuit to maintain a second predetermined substantially constant temperature in the enclosed space, and a switch arm movable to two positions, said arm when in one of said positions making said circuit to one of said contact members and when in a second of said positions making said circuit to the other of said contact members.

15. A thermostat for controlling the circuit of an electricaly operated controlling means for controlling the temperature of an enclosed space comprising a base member, a pair of contact members mounted on said base member, a thermostatic element, said element being cooperable with one of said contact members to control the circuit of the controlling means to maintain a relatively high substantially constant temperature in the enclosed space, a second thermostatic element, said second-named thermostatic element being cooperable with the other of said contact members to maintain a relatively low substantially constant temperature in the enclosed space, and electrical heating means for heating and influencing the operation of said elements and controlled by either of said elements.

16. In a control device, a contact member, a movable adjustment member, a thermostatic element carried by said adjustment member and cooperable with said contact member, means for moving said adjustment member to adjust the position of said element relative to said contact member, a heating element operable to heat and influence the operation of said thermostatic element, said heating element being carried by said movable adjustment member and movable therewith so that the position of said heating element with respect to said thermostatic element will not change upon adjustment of said thermostatic element, said heating element being movable relative to said adjustment member and closer to or farther away from said thermostatic element to vary the effectiveness of said heating element on said thermostatic element, and means for moving said heating element.

17. A thermostat, comprising a base member, an adjustable supporting member movably mounted on said base member, thermostatic operating means carried by said supporting member, a heating element carried by said supporting member and positioned in heat exchange relation to said thermostatic means, and means for regulating the heat input to said thermostatic means by said heating element.

18. A thermostat, comprising a base member, an adjustable supporting member movably mounted on said base member, thermostatic means carried by said supporting member, a supporting means mounted for movement relative to said supporting member, a heating element carried by said supporting means and disposed for heating said thermostatic means, and means for moving said supporting means relative to said thermostatic means thereby to regulate the heat input from said heating element to said thermostatic means.

19. A thermostat, comprising a base member, an adjustable supporting member movably mounted on said base member, thermostatic operating means carried by said supporting member, mounting means carried by and movable relative to said supporting member, a heating element adjacent said operating means and carried by and readily removable from said mounting means, and a screw-threaded member interconnecting said supporting member and said mounting means and operable to move said mounting means for controlling the heat input from said element to said operating means.

20. A thermostat, comprising a base member, an adjustable supporting member having an aperture therethrough and movably mounted on said base member, thermostatic operating means carried by said supporting member, mounting means slidably carried by said supporting member and having a portion registering with said aperture, a heating element mounted in fixed position on said mounting means, said mounting means including electric insulating material to insulate said element from said supporting member, an electrical connecting means extending through said aperture and electrically connected to said element, and means for moving said mounting means for controlling the heat input from said element to said operating means.

21. In a control device, a base member, an adjustable supporting member movably mounted on said base member, thermostatic means carried by said supporting member, a heating element disposed for heating said means, said heating element being movable relative to said supporting member and to said means, and means for moving said heating element to regulate the heat input to said thermostatic means.

22. A thermostat, comprising a base member, an adjustable supporting member movably mounted on said base member, bimetallic means secured adjacent one of its end portions to said supporting member, contact means carried by the other end portion of said bimetallic means, a contact member supported on said base member and cooperable with said contact means, magnetic means carried by said base member for effecting a quick movement of and establishing a differential of operation of said bimetallic means, electric heating means movably mounted relative to said base member and positioned adjacent said bimetallic means to supply heat to said bimetallic means, and means to move said heating means relative to said bimetallic means to vary the differential of operation while preserving the quick movement of said bimetallic means effected by said magnetic means.

23. A thermostat comprising a base member, laterally spaced supporting members mounted on said base member, contact members, one carried by each of said supporting members, contact members movably mounted for engagement with said first-named contact members, bimetallic means supporting said movable contact members and mounted on said base member, switch means mounted on the opposite side of said base member from said bimetallic means, said switch means having a plurality of contact members, one of said switch contact members being electrically connected to one of said first-named contact members and the other of said switch contact members being electrically connected to the other of said first-named contact members, and manually operable means engageable from the bimetallic means side of said base member for actuating said switch means to establish an electric circuit for one of or the other of said first-named contact members.

24. In a device of the character described, a base member, a laterally movable member supported by said base member, a plurality of superposed magnetic elements positioned at one side of said movable member, a spacer member separate from and positioned bodily between said elements, and means rigidly securing said elements to said spacer member and securing said elements and spacer member to said base member, said last-named means having direct clamping engagement with one of said elements.

25. In a device of the character described, an adjustable member having a flange portion, a cam member supported adjacent said portion, a cam follower member cooperable with said cam member, said follower member having screw-threaded adjustment in said flange portion, and a leaf spring secured to said flange portion and tensioned against said follower member.

EARNEST J. DILLMAN.